US007796954B2

(12) United States Patent
Whitaker Filho

(10) Patent No.: US 7,796,954 B2
(45) Date of Patent: Sep. 14, 2010

(54) PRESENCE OF COMMUNICATION INTERLOCK METHOD AND APPARATUS FOR REDUCING OR ELIMINATING AIRCRAFT COMMUNICATIONS RADIO INTERFERENCE

(75) Inventor: Nelson Whitaker Filho, Sao Paulo (BR)

(73) Assignee: Embraer-Empresa Brasileira de Aeronautica S. A., Sao Jose Dos Campos-SP (BR)

( * ) Notice: Subject to any disclaimer, the term of this patent is extended or adjusted under 35 U.S.C. 154(b) by 825 days.

(21) Appl. No.: 11/734,013

(22) Filed: Apr. 11, 2007

(65) Prior Publication Data

US 2008/0254750 A1    Oct. 16, 2008

(51) Int. Cl.
*H04B 1/40* (2006.01)
(52) U.S. Cl. .............................. 455/73; 455/78; 455/88; 340/945
(58) Field of Classification Search .................... 455/73, 455/78, 79, 88, 517, 528; 340/945, 825.03, 340/825.04
See application file for complete search history.

(56) References Cited

U.S. PATENT DOCUMENTS 5,031,095 A * 7/1991 Hara et al. .................. 709/236
5,291,518 A   3/1994 Stutman 5,809,402 A * 9/1998 Lemme ........................ 455/73

FOREIGN PATENT DOCUMENTS

JP         408251313 A  *  9/1996

OTHER PUBLICATIONS

Honeywell, VHF Digital Link (VDL) Primer, 10 pages (2003).
Avionics Maintenance Conference, "2005 AMC Report," Atlanta, Georgia, Apr. 25-28, 2005, AMC Publication 05-105/ MSG-211, 307 pages (Jun. 15, 2005).

* cited by examiner

*Primary Examiner*—Yuwen Pan
(74) *Attorney, Agent, or Firm*—Nixon & Vanderhye PC

(57) ABSTRACT

In one exemplary illustrative non-limiting aircraft radio communications system, a "POCI" ("Presence Of Communication Interlock") is comprised of a double balanced low pass LC filter covering the voice range. The voice signals coming from the two VHF's are filtered and processed by an amplifier at an adequate level to be peak detected. The resulting signal is applied to an amplifier with a defined hysteresis and time constant and finally drives the relay interlock circuit that inhibits an ACARS VHF radio from transmitting whenever other on-board comm. VHF transceivers are receiving voice signals. Visual indicators provide information on system operation and system power failure.

11 Claims, 4 Drawing Sheets

EXEMPLARY POCI SYSTEM, SIMPLIFIED BLOCK DIAGRAM

Fig. 2 EXEMPLARY POCI SYSTEM, SIMPLIFIED BLOCK DIAGRAM

Fig. 3 EXEMPLARY POCI SYSTEM, SCHEMATIC DIAGRAM

PRESENCE OF COMMUNICATION INTERLOCK METHOD AND APPARATUS FOR REDUCING OR ELIMINATING AIRCRAFT COMMUNICATIONS RADIO INTERFERENCE

CROSS-REFERENCE TO RELATED APPLICATIONS

Not applicable.

FIELD

The technology herein relates to aircraft onboard radio communications, and more particularly to method and apparatus for reducing or eliminating VHF (Very High Frequency) or other radio interference on board an aircraft. Still more particularly, the technology herein relates to an arrangement for interlocking or inhibiting ACARS data transmission during active voice reception.

BACKGROUND AND SUMMARY

Air-to-ground and air-to-air radio communications are important to safe aircraft flight. Modern aircraft are equipped with a multitude of radio communications systems, many of them operating in generally the same Very High Frequency (VHF) radio band (30 MHz to 300 MHz). These various radio systems allow the aircraft to remain in essentially constant communication with the ground. Flight crews use so-called "comm" voice radios to talk with air traffic controllers to get clearance to take off, land, change altitude and/or course, and for other reasons. The flight crews also use voice radios to exchange important safety information with other nearby aircraft. Such simplex or half-duplex VHF radio transceivers mute or inhibit a radio receiver while an associated transmitter is operating. Most modern radio transceivers operate in this fashion (i.e., the receiver circuitry within the transceiver is disabled whenever the user depresses PTT (push to talk) to activate the transmitter).

VHF radio communications is also used to carry data to and from the aircraft. Such data communications can give pilots updated weather and other alert information and can also automatically inform ground crews about the status of the aircraft's vital systems.

Most commercial aircraft are currently equipped with three VHF Radios, two of which are used for ATC voice communications and one is used for ACARS data link, also referred to Airlines Operational Control (AOC) communications. Generally speaking, only one radio is used for data communications because the type of data communications is not considered essential for the dispatch of the aircraft. These various different radios supply redundancy in case of failure and also provide compatibility with different communications systems and networks.

The most prevalent data radio communications system in current commercial aircraft use is ACARS (Aircraft Communication Addressing and Reporting System), a two-way VHF data link messaging system primarily utilized by air carriers. This system has been successfully used for routine AOC and AAC text messages, such as weather, dispatch, and administrative messages. Such messages for example can be displayed on an ACARS CRT or other display in the aircraft cockpit. ACARS has also been demonstrated for certain ground and in-flight messages, such as pre-departure clearances, expected taxi clearances, and Digital Automatic Terminal Information Service (D-ATIS). This experience has shown the potential for data link as a responsible use of spectrum resources and support for enhanced flightcrew situational awareness. See for example ARINC 607 and FAA Advisory Circular No. 00-63 (Sep. 24, 2004), each incorporated herein by reference.

The ACARS system components on board an aircraft can receive data from the ground and can send data upon flight crew command. The ACARS system is also designed to send data messages automatically and autonomously to ground based stations with no requirement for flight crew interaction. A network of VHF ground based transceivers (often referred to as Remote Ground Stations, or RGSs) provide typical ranges that are dependent on altitude, with a 200-mile transmission range common at high altitudes. This network of ground stations can receive ACARS data transmissions from the aircraft and forward them to appropriate ground resources (e.g., an airline's maintenance personnel). For example, the ACARS system can automatically transmit engine data concerning engine status or problems (e.g., excessive engine vibration or oil temperature). Such transmissions can be initiated without any flight crew action, and enable ground personnel to be notified of potential problems on the aircraft in real time.

One problem encountered in the past relates to interference between other on-board co-band or other radios. Because the flight crew does not control when an ACARS transceiver begins to autonomously transmit VHF data bursts, it sometimes happens (as FIG. 1 illustrates) that the flight crew may be trying to receive and listen to VHF voice transmissions on a different VHF frequency (e.g., from a control tower, an air traffic controller, or another airplane) at the same time the ACARS system begins transmitting. The autonomously-initiated ACARS VHF transmissions can cause interference to other active onboard receivers operating on the same (e.g., VHF) radio band. For example, when ACARS begins transmitting a data burst, a voice communications radio in the process of receiving a tower or other voice communication may produce a chirp noise. Such chirp noise "interference" can significantly disrupt the operation of the other active VHF transceivers in the vicinity and cause problems with intelligibility.

Flight crews sometimes complain that the ACARS data burst interrupts communications with the tower upon departure, and they have to ask the tower to repeat instructions to them. Therefore, there is some concern on the flight crew's part in being able to maintain communications. See for example ARINC Report Reference 05-105/MSG-211 entitled "Communications Systems" item no. 72 at page 78 of Avionics Maintenance Conference 2005 AMC Report (Apr. 25-28, 2005 Atlanta Georgia).

There have been past efforts to minimize such interference. Some past approaches have used traditional processes involving antenna separation. Increasing the physical distance between antennas mounted on the aircraft fuselage can reduce the potential for interference. Antennas mounted on the same side of the aircraft are generally provided at a minimum separation (e.g., 38 feet) to achieve necessary isolation. However, size limitations on business and regional aircraft can preclude installing the antennas with spacing adequate to provide 40 dB of isolation necessary to prevent cross talk.

Other approaches have relied on activation of a so-called "Simulcom" feature on certain VHF radios that promotes gain reduction in reception mode. Given the limitation of antenna spacing and therefore the operating environment, activation of the Simulcom feature on certain VHF radios provides some improvement by reducing receiver gain when another radio is keyed. However, Simulcom may not eliminate cross talk in all cases. For specific problems of ACARS interference at take off, some radio manufacturers suggest delaying transmission of the ACARS "OFF" event a certain wait time (e.g., 20 seconds to approximately 90 seconds) after the weight off wheels transition. See e.g., ARINC Reference 05-105/MSG-2W cited above. This could minimize any interference during critical communications with ATC but has its own set of issues.

While much work has been done in the past, further improvements are possible and desirable.

The exemplary illustrative non-limiting technology described herein includes an electronic circuit that monitors the incoming voice or other information content on plural VHF radio receivers or transceivers, and selectively inhibits any transmission on the third VHF with the associated ACARS. The exemplary illustrative non-limiting intervention causes no penalty since the ACARS data terminal will retry transmission of the data as soon the associated VHF has been reestablished The proposed exemplary illustrative non-limiting technology herein can for example be incorporated as a feature on ACARS equipment.

BRIEF DESCRIPTION OF THE DRAWINGS

These and other features and advantages will be better and more completely understood by referring to the following detailed description of exemplary non-limiting illustrative embodiments in conjunction with the drawings of which.

DETAILED DESCRIPTION

The following disclosure provides an exemplary illustrative non-limiting implementation for reducing or eliminating undesirable chirp noise that can be caused by the ACARS system and associated VHF on aircraft communications systems.

Figure 1:
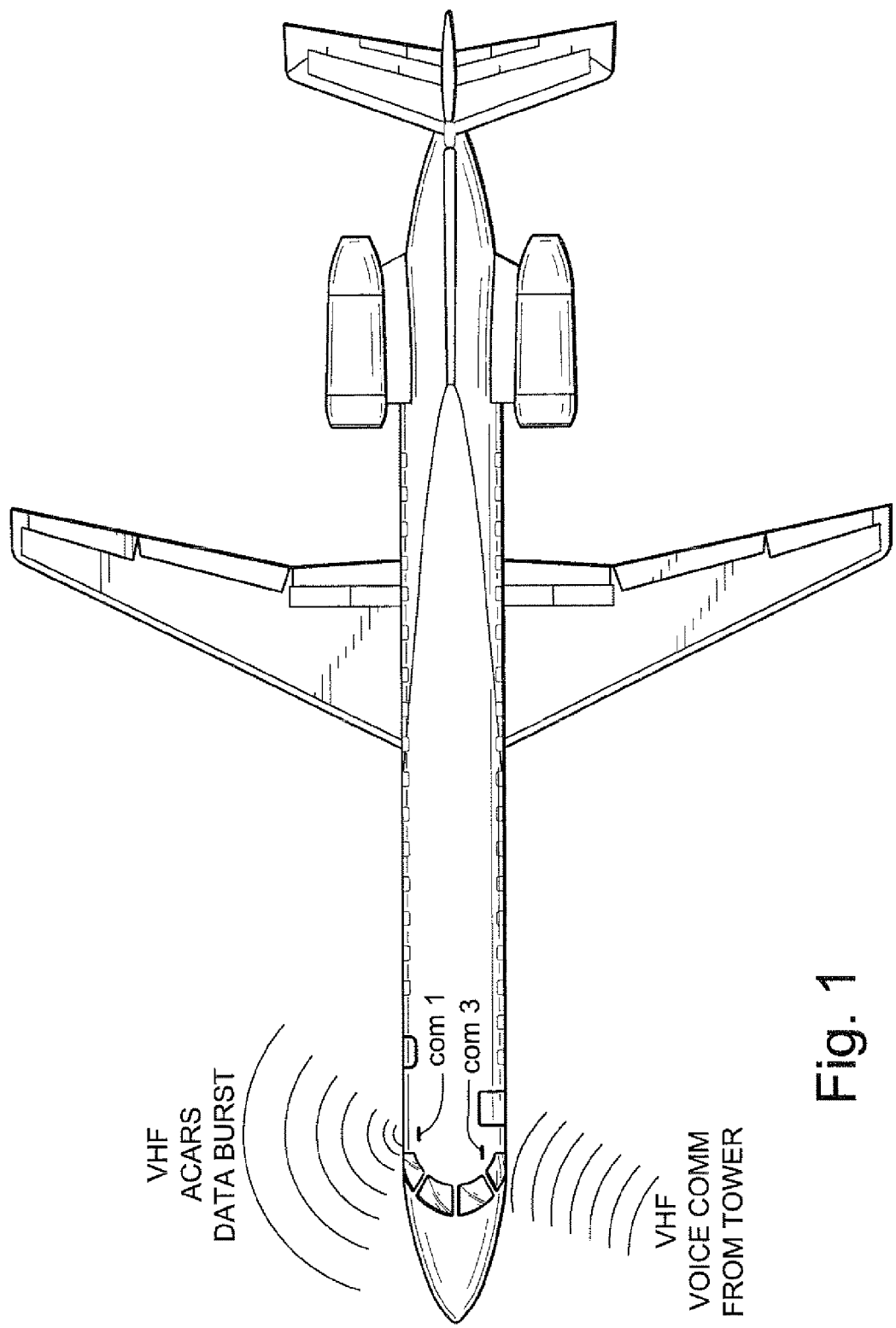
FIG. 1 shows an aircraft simultaneously receiving on one VHF frequency and transmitting on another VHF frequency.

In one exemplary illustrative non-limiting implementation, Comm 1 and Comm 3 antennas are installed on the same side of the aircraft (e.g., top). See FIG. 1. Other installations may for example rely on a minimum antenna separation (e.g., 38 feet) for antennas that are installed on the same side of the aircraft. While other techniques can be used to reduce the splashovers, it is not unusual to continue to get splashover when VHF 1 or VHF 2 operate at close to the frequency of ACARS.

In one exemplary illustrative non-limiting implementation, a "POCI" (Presence Of Communication Interlock) 50 is provided to prevent the ACARS transmitter from transmitting during times when other radios (e.g., VHF1, VHF2) are actively receiving voice communications (any Simulcom feature may or may not be activated when the ACARS CMU (computer-based system) is keying a radio, but may be disabled to prevent receiver desensitization). Since typical ACARS CMU's are designed to buffer output data to send, and continue to retry sending such data until acknowledged, no ACARS data intended to be transmitted is lost. In the exemplary illustrative non-limiting implementation, ACARS transmissions are merely delayed until no voice signals are being received and the ACARS data is then transmitted. Such operation requires no modification of the ACARS CMU or VHF transceiver in one exemplary illustrative non-limiting implementation.

Figure 2:
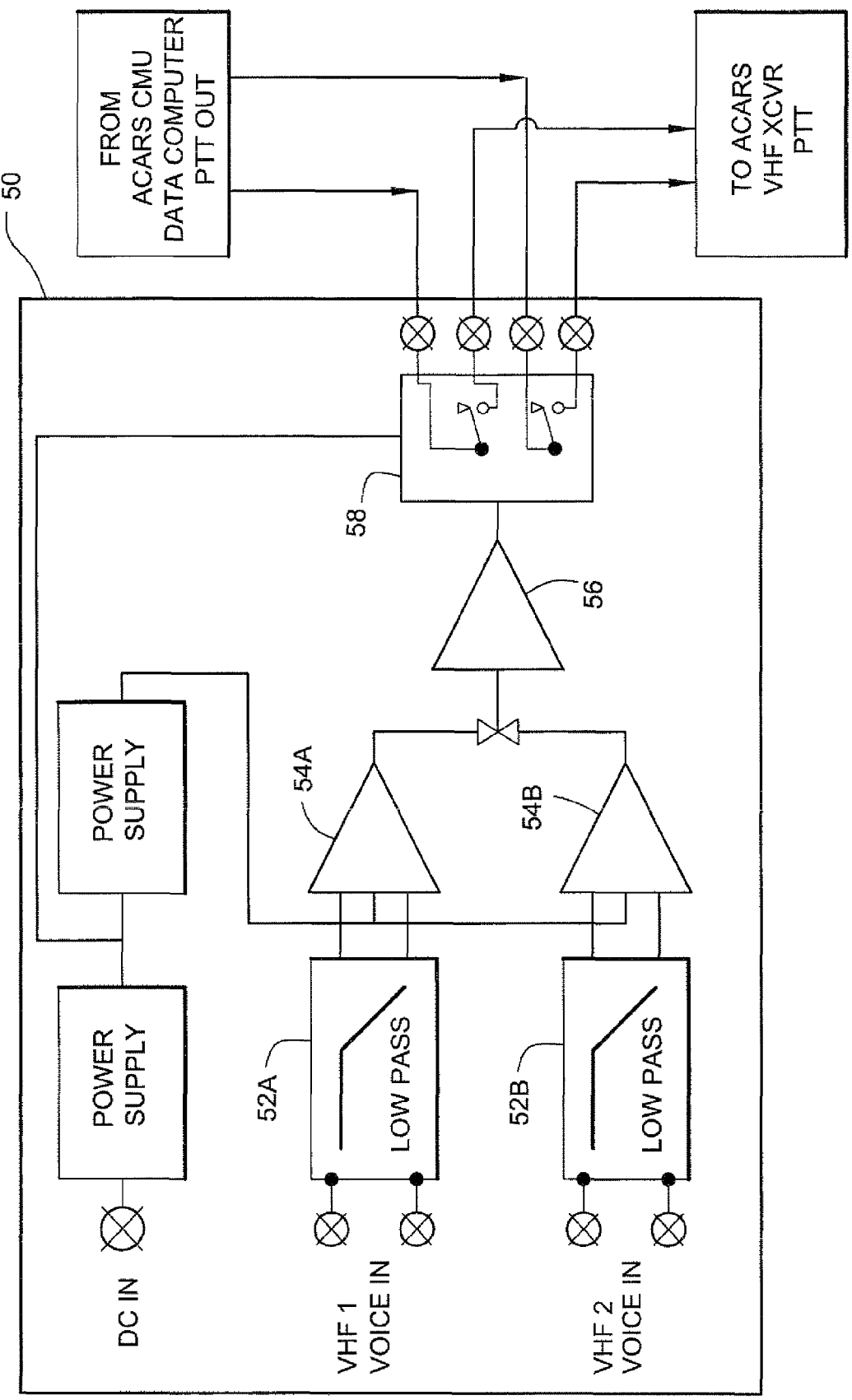
FIG. 2 is a simplified block diagram of an exemplary illustrative non-limiting system.

As shown in FIG. 2, one exemplary illustrative non-limiting implementation of presence of interlock system 50 includes a double balanced low pass LC filter 52 covering the voice range. The voice signals coming from the two VHF receivers (e.g., VHF1 and VHF2) are filtered and processed by an amplifier 54 at an adequate level to be peak detected. The resulting signal is applied to an amplifier 56 with a defined hysteresis and time constant and finally drives the relay interlock circuit 58. Two LED's (not shown) or other indicators provide information on system operation and system power failure.

In more detail, FIG. 2 shows two low-pass filters 52A, 52B each coupled to receptive "voice in" outputs from respective receptive VHF radios VHF1, VHF2. The low-pass filters 52A, 52B, in one exemplary illustrative non-limiting implementation, have low-pass filter characteristics that pass only frequencies commonly found within the human voice (e.g., below 2.3 KHz). These low-pass filters thus prevent higher frequency noise, spikes, or other received non-voice signals from causing the interlock circuit to operate.

In one exemplary illustrative non-limiting implementation, amplifiers 54A, 54B provide a peak detection output when respective signals are present at the "voice in" terminals. The system generates an output (which can be switch or relay closures 58 in one exemplary illustrative non-limiting implementation) when at least one of amplifier 54A and amplifier 54B is providing an output. This system output is used to temporarily disable transmission capability of yet another transmitter—in this case an ACARS VHF3 transceiver.

In one exemplary illustrative non-limiting implementation, an ACARS CMU Push-To-Talk (PTT) transmitter keying control signal output is connected in series through contacts provided by relay 58. Relay contacts 58 are normally closed (NC), thereby normally allowing the ACARS CMU to apply its transmitter keying control signal to a VHF3 transceiver used to transmit ACARS data bursts. When amplifier 56 drives relay 58 to open its contacts 58, the ACARS transmitter keying signal can no longer reach the VHF3 transceiver and accordingly the transceiver remains unkeyed so long as either the VHF1 radio or the VHF2 radio is receiving a voice signal.

In one exemplary illustrative non-limiting implementation, the ACARS system uses a data transmission protocol providing guaranteed reliable message delivery. The ACARS protocol currently in use today requires that each transmitted packet must be positively acknowledged by a receiving station. ACARS will re-transmit the packet if it is not acknowledged. The ACARS protocol allows transmission of a sequence of packets and acknowledgement of the whole sequence with a single acknowledgement. An ACARS CMU thus expects to receive an explicit acknowledgement from a ground station to each of its data block transmissions before sending additional ACARS data blocks, and will continue to attempt to resend previously unacknowledged data messages until the messages are acknowledged. See ARINC ACARS Specification 631.

The exemplary illustrative non-limiting implementation takes advantage of the ACARS positive-acknowledge protocol to provide reliable data communications while at the same time intermittently inhibiting the ACARS transceiver from transmitting without informing the ACARS MDU of its inhibiting action. In one exemplary illustrative non-limiting implementation, when relay 56 drives relay contacts 58 open so that the ACARS CMU can no longer key the ACARS transmitter, the ACARS CMU does not "know" that it has lost the ability to control the transmitter to transmit. The ACARS CMU therefore proceeds just as if it had been able to control transmission even during times when the presence of communications interlock circuit 50 has intermittently interrupted transmission. Since the ACARS transmitter never actually transmitted the data packet(s) the ACARS CMU requested it to transmit, the ACARS CMU will never receive any positive acknowledgement. Therefore, the ACARS CMU will attempt to retransmit the packet(s) over and over again until transmission is finally successful. Such retry intervals may be for example on the order of once every 0.5 seconds. At some point, when incoming voice communications ceases (aircraft voice communications are generally short and to the point), amplifier 56 will allow relay contacts 58 to close and the ACARS CMU can once again successfully key the ACARS VHF transmitter. At that time, the ACARS CMU will be able to successfully transmit the data packets it has been trying to send. As soon as the ACARS VHF transceiver receives a positive acknowledgement from the ground station network, it can proceed to send additional data bursts (if any).

Incoming voice communications can occur at any time—even during times when the ACARS VHF transceiver is in the middle of a transmission. In such instances, amplifier 58 will drive relay contacts 58 open and the ACARS radio transmission will be terminated before it has completed its current transmission. Because of the ACARS guaranteed reliable positive acknowledge protocol in use, the ACARS CMU will in this case attempt to retry transmission when it does not receive a timely acknowledgement from the ground station network. Thus, once received voice communication terminates, the presence of communications interlock circuit 50 will once again allow the ACARS CMU to re-key the ACARS transceiver to retransmit the previously interrupted transmission. Meanwhile, clear priority is given to allowing the flight crew to receive voice communications.

Figure 3:
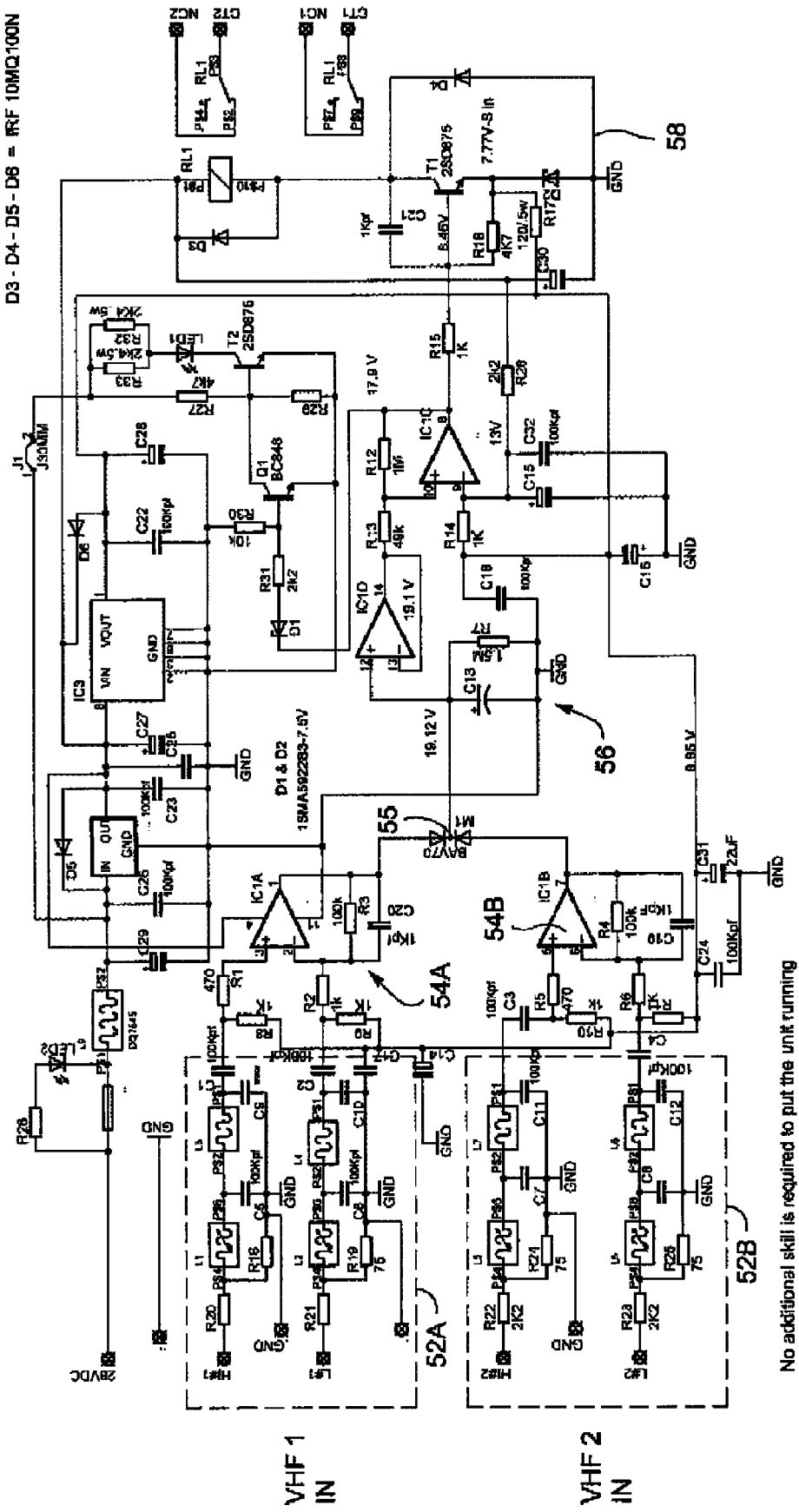
FIG. 3 is an exemplary illustrative non-limiting schematic diagram.

FIG. 3 shows an exemplary illustrative non-limiting detailed schematic circuit diagram. Low-pass filters 52a, 52b are applied to each "voice in" to detect signals within the range of human speech. In this exemplary implementation, filters 52a, 52b comprise cascaded LC networks with the first LC network including an adjustable inductor. The inductors are adjusted to provide appropriate lowpass filtering passbands. In one exemplary illustrative non-limiting implementation, the adjustable inductors are set by applying a 2.3 KHz audio signal to the input of the filter and then adjusting the inductance until significant rolloff is provided at that frequency (e.g., attenuation of the signal from 8 V peak to peak to 5.3 V peak to peak).

The resulting filtered signals are respectively amplified by respective operational amplifiers 54a, 54b. The outputs of two such op amps are coupled together (using diode isolation) at a summing node 55. The summing node output is applied to further amplification 56 and peak detection. The resulting peak detected output is used to drive the primary coils of a relay 58. The relay can be used to selectively deactivate an additional VHF transmitter during the time that voice communications is being received by other VHF receivers.

The FIG. 3 circuit further includes power supply circuitry, and two light emitting diodes. One LED indicates when power is present, and the other indicates when amplifier 56 is generating an output.

Figure 4:
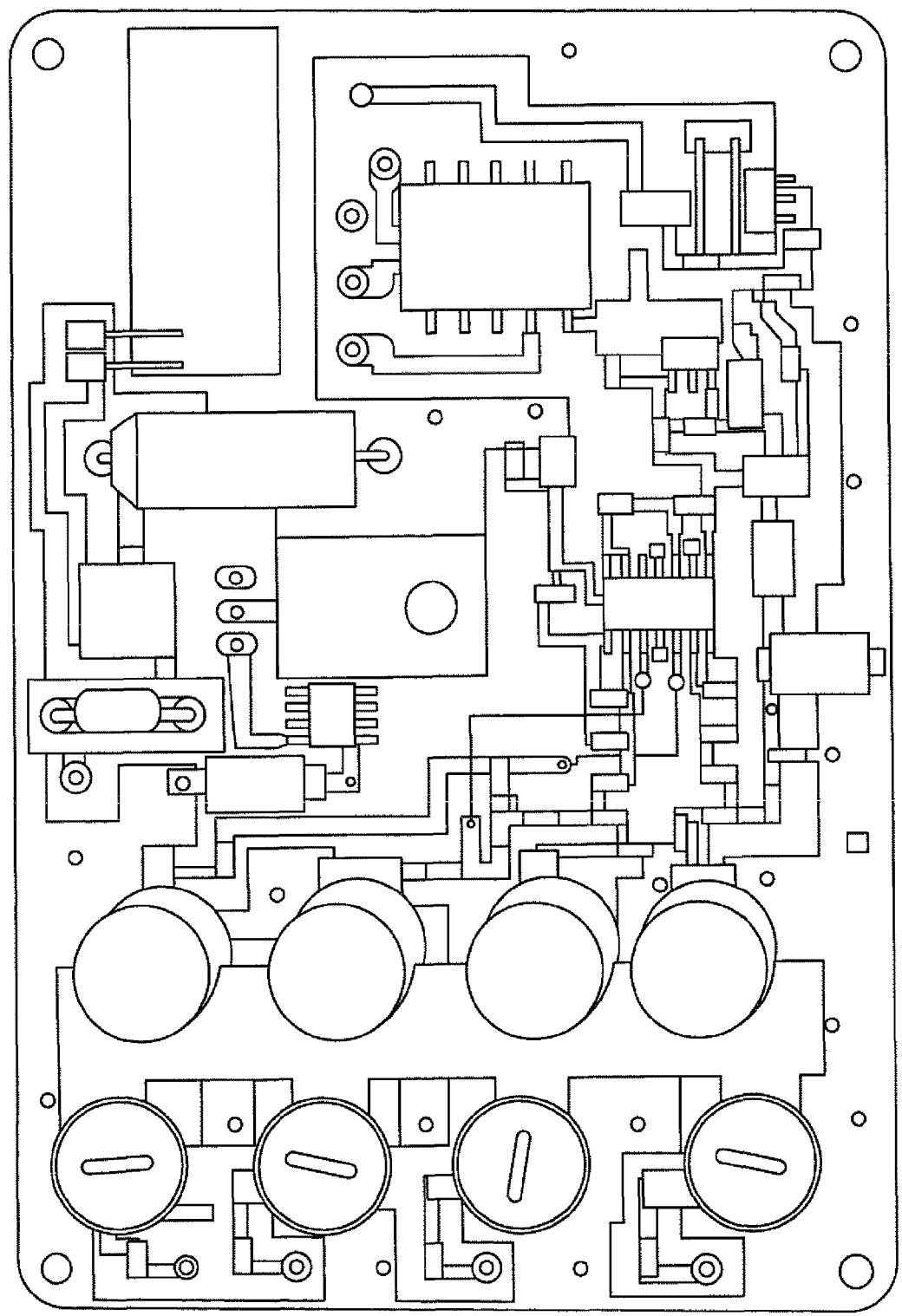
FIG. 4 is an exemplary illustrative non-limiting PC board and component location view.

FIG. 4 shows an exemplary illustrative non-limiting circuit board implementation. One can see the low-pass filter variable inductors on the left-hand side of the circuit board, and fixed inductors next to the variable inductors. The relay is shown on the right-hand side of the circuit board coupled to the NC1, CT1, NC2 and CT2 terminals. Power supply components are generally located at the top of the circuit board.

While the technology herein has been described in connection with exemplary illustrative non-limiting embodiments, the invention is not to be limited by the disclosure. For example, in other implementations, voice reception of any number of radios can be detected. In other implementations, the ACARS CMU and/or transceiver can be modified to include a presence of communications interlock providing the overall transmission inhibiting functionality using different circuits, software arrangements or other components. The invention is intended to be defined by the claims and to cover all corresponding and equivalent arrangements whether or not specifically disclosed herein.

I claim:

1. An aircraft radio communications system comprising:
a first filter coupled to process a first received audio signal;
a second filter coupled to process a second received audio signal;
a summing node coupled to said first and second filters; and
a control element coupled to said summing node, said control element inhibiting radio transmissions temporarily while said first and/or second received audio signals are active to thereby give priority to voice radio communications reception over data transmission.

2. The system of claim 1 wherein said first filter comprises a voice band lowpass filter.

3. The system of claim 1 wherein said radio transmissions comprise ACARS data transmissions.

4. The system of claim 1 wherein said first filter includes an adjustable LC network.

5. The system of claim 1 further including a peak detector coupled between at least one of said first and second filters and said control element.

6. The system of claim 1 wherein said control element comprises a relay.

7. The system of claim 1 wherein said control elements inhibits said radio transmissions whenever voice audio signals are present at either said first filter or said second filter.

8. The system of claim 1 wherein said control element comprises at least one connector that connects said control element between the push to talk output of an ACARS MDU data terminal and a VHF transceiver push to talk control input.

9. A method of operating radio systems onboard an aircraft comprising:
(a) detecting presence of voice signals at the output of a first VHF channel;
(b) detecting presence of voice signals at a second VHF channel;
(c) temporarily inhibiting ACARS data transmission whenever either of said detecting steps (a), (b) detect voice signals without informing an ACARS MDU that said data transmissions have been inhibited, and
(d) relying on ACARS retry protocol features to nevertheless ensure eventual successful retransmission of data messages.

10. A system for preventing radio interference on board a moving platform, comprising:
(a) placing an interrupter between a data terminal push to talk output and a radio transceiver push to talk input, said radio transceiver operating on a first radio channel;
(b) receiving voice signals on a second radio channel different from said first channel;
(c) controlling said interrupter to interrupt the connection between said data terminal and said radio transceiver any time a voice signal is received on said second channel; and (d) relying on a guaranteed reliable communications protocol used by said data terminal to ensure later timely retry and transmission of messages from said data terminal despite said interruptions.

11. A method of providing non-interfering radio communications system on board an aircraft comprising:
   filtering a first received audio signal;
   filtering a second received audio signal;
   summing said first and second filtered audio signals;
   temporarily inhibiting data burst radio transmissions temporarily while said summed first and/or second filtered received audio signals are active; and
   transmitting said previously inhibited data burst radio transmissions once said summed first and second filtered received audio signals are no longer active.

* * * * *